US007678034B2

(12) United States Patent
Wilhelm

(10) Patent No.: US 7,678,034 B2
(45) Date of Patent: Mar. 16, 2010

(54) EMBOSSING ROLL AND EMBOSSED SUBSTRATE

(75) Inventor: Lee Delson Wilhelm, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1194 days.

(21) Appl. No.: 10/748,650

(22) Filed: Dec. 30, 2003

(65) Prior Publication Data

US 2005/0138981 A1 Jun. 30, 2005

(51) Int. Cl.
*A01B 29/04* (2006.01)

(52) U.S. Cl. .............................. 492/33; 492/36; 492/31

(58) Field of Classification Search ................... 492/33, 492/36, 31; 162/117, 109
See application file for complete search history.

(56) References Cited

U.S. PATENT DOCUMENTS 2,338,635 A * 1/1944 Galber ........................ 492/33
4,068,620 A * 1/1978 Peters ........................ 118/249
4,320,162 A 3/1982 Schulz
4,759,967 A * 7/1988 Bauernfeind ................ 428/154
4,921,034 A * 5/1990 Burgess et al. ............. 162/109
D319,349 S 8/1991 Schultz et al.
5,300,347 A 4/1994 Underhill et al.
5,529,563 A 6/1996 Veith et al.
5,573,803 A 11/1996 Omessi
5,573,830 A 11/1996 Schulz
5,597,639 A * 1/1997 Schulz ........................ 428/156
5,620,776 A 4/1997 Schulz
5,840,404 A * 11/1998 Graff .......................... 428/154
D409,839 S 5/1999 Wilhelm et al.
6,170,728 B1 * 1/2001 Zenczak et al. ............. 226/193
6,173,496 B1 * 1/2001 Makoui et al. ........... 29/895.21
6,302,998 B1 * 10/2001 Burgess ...................... 162/109
D449,943 S 11/2001 Lanham
6,331,228 B1 12/2001 Heath et al.
6,502,273 B1 * 1/2003 Mihara et al. ............ 15/230.16
2002/0007749 A1 * 1/2002 Makoui et al. ........... 101/401.1
2004/0026239 A1 * 2/2004 Kishimi et al. .............. 204/288
2004/0109911 A1 * 6/2004 Boegli ........................ 425/363

FOREIGN PATENT DOCUMENTS

GB 2 376 436 A 12/2002

* cited by examiner

*Primary Examiner*—David P Bryant
*Assistant Examiner*—Sarang Afzali
(74) *Attorney, Agent, or Firm*—Gregory E. Crott; Scott A. Baum

(57) ABSTRACT

An apparatus including a surface containing at least one embossing element. The embossing element having a first sidewall angle and a second sidewall angle and wherein the first sidewall angle is different than the second sidewall angle.

17 Claims, 6 Drawing Sheets

EMBOSSING ROLL AND EMBOSSED SUBSTRATE

BACKGROUND

Embossing refers to the act of mechanically working a substrate to cause the substrate to conform under pressure to the depths and contours of a pattern engraved or otherwise formed on an embossing roll. It is widely used in the production of consumer goods. Manufacturers use the embossing process to impart a texture or relief pattern into products made of textiles, paper, synthetic materials, plastic materials, metals, and wood.

The pattern which is formed in the web may be formed by debossing or embossing. When an emboss pattern is formed, the reverse side of the substrate retains a deboss pattern. The projections which are formed are referred to as bosses. When a deboss pattern is formed, the reverse side of the substrate retains an emboss pattern and the projections are still referred to as bosses. Thus, the methodologies may be interchanged while producing the same product.

The product may include bosses made up of any embossing design. The bosses are most often a design which may be related by consumer perception to the particular manufacturer of the product. The bosses function in essentially the same manner regardless of the aesthetic design which may include stitches, patchwork, hearts, butterflies, flowers and the like.

Embossing a product can enhance the visual perception, aesthetic appearance, physical attributes, or performance of the product. For example, embossing is a well known process for increasing a substrates' bulk, changing its physical attributes, making it more visually appealing, and/or improving its tactile properties. Additionally, many embossing patterns are patented to protect the unique appearance of the design.

In the production of paper, such as tissue paper, it is often desirable to combine a high degree of softness, which contributes to a good feeling for the user, with an appealing aesthetic appearance. An embossed tissue often contributes to a voluminous and soft feel while improving the aesthetic appearance. Improving the embossing process and the visual appearance of the embossed substrate can improve the tissue's properties and/or the user's perception. Thus, there is a general objective in the embossing field to improve the appearance or embossing definition produced in the substrate by the embossing process.

SUMMARY

By controlling the geometry of the embossing elements on the embossing surface, the inventor has found that the embossing definition in the embossed substrate can be improved. Embossing elements having one sidewall at a different sidewall angle than the other sidewall have been found to produce better pattern definition in the embossed substrate. In particular, an embossing element having one very steep sidewall with a small or even negative sidewall angle has been found to produce better pattern definition in the embossed substrate. An engraved roll suited to commercial production having a long life and providing superior embossing definition can be manufactured for example by laser engraving these elements onto a conventional steel roll. Suitable rolls may also be produced by using Electric Discharge Machining or Electric Deposition of Materials processes in place of the laser engraving process.

Hence, in one embodiment, the invention resides in an apparatus including a surface containing at least one embossing element. The embossing element has a first sidewall angle and a second sidewall angle and the first sidewall angle is different than the second sidewall angle.

BRIEF DESCRIPTION OF THE DRAWINGS

The above aspects and other features, aspects, and advantages of the present invention will become better understood with regard to the following description, appended claims, and accompanying drawings in which:

Figure 1:
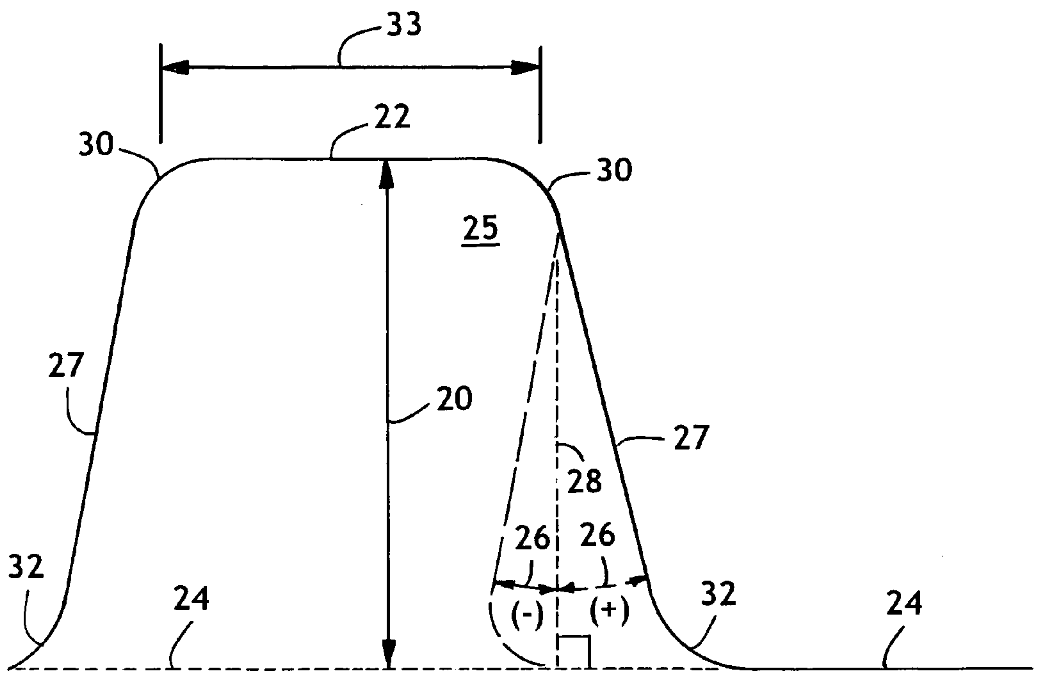
FIG. 1 illustrates common parameters for an embossing element.

Repeated use of reference characters in the specification and drawings is intended to represent the same or analogous features or elements of the invention.

DEFINITIONS

As used herein, including the claims, forms of the words "comprise," "have," and "include" are legally equivalent and open-ended. Therefore, additional non-recited elements, functions, steps or limitations may be present in addition to the recited elements, functions, steps, or limitations.

As used herein "substrate" is a flexible sheet or web material, which is useful for household chores, personal care, health care, food wrapping, or cosmetic application or removal. Non-limiting examples of suitable substrates include nonwoven substrates; woven substrates; hydro-entangled substrates; air-entangled substrates; paper substrates comprising cellulose such as tissue paper, toilet paper, or paper towels; waxed paper substrates; coform substrates comprising cellulose fibers and polymer fibers; wet substrates such as wet wipes, moist cleaning wipes, moist toilet paper wipes, and baby wipes; film or plastic substrates such as those used to wrap food; and metal substrates such as aluminum foil. Furthermore, laminated or plied together substrates of two or more layers of any of the preceding substrates are also suitable.

DETAILED DESCRIPTION

It is to be understood by one of ordinary skill in the art that the present discussion is a description of specific embodiments only and is not intended to limit the broader aspects of the present invention.

An embossing pattern on a substrate can be applied using one or more steel rolls in combination with elastomeric covered rolls that form nips through which the substrate passes. The nips can be adjusted to either a specific loading force or set for a specific deformation or nip width. The elastomeric roll, known to the art as a rubber roll, has a surface that deforms and yields when pressed against a raised embossing pattern on the steel roll. As the web passes through the nip between the rolls, the pattern on the steel roll is imparted onto the substrate. The elastomeric roll generally has a hardness between approximately 40 to 80 Durometer on the Shore A scale.

U.S. Pat. No. 4,320,162, herein incorporated by reference, describes an application of this steel/rubber embossing method. The patent describes an embossing process in which a substrate is embossed with a first pattern embossment and a second pattern embossment, having different heights. The elements forming the background pattern are lower than the elements forming the graphic pattern. The provision of greater height to the graphic embossments can impart a better visibility against the background pattern of smaller embossments. Another patent with different height embossments is U.S. Pat. No. 5,597,639, herein incorporated by reference, that describes an embossing pattern with stitchlike bosses engraved at 0.050 inch height and signature bosses engraved at 0.060 inch height.

U.S. Pat. No. 5,573,803, herein incorporated by reference, describes an embossing pattern in which a substrate is embossed with three distinct elements, all at 0.060 inch engraving height. The stitchlike bosses are engraved with a rounded top, the flower signature bosses are engraved with a flat top, and the heart signature bosses are engraved with crenels and merlons on the top. The provision of lesser radii on the tops of the graphic embossments can impart a better visibility against the background pattern of embossments with greater radii on their tops.

The steel/rubber embossing process utilizes an engraved embossing roll composed of steel or other material which is significantly harder than the covering material on the rubber roll, and having the desired pattern to be embossed into the substrate.

One method of producing an embossing roll is to engrave the desired embossing pattern in steel. Steel embossing rolls are generally manufactured using a conventional engraving process. The basic process starts by selecting a pattern that is to be applied to the roll's circumference. The pattern is then redesigned to meet both the customers' specification and the requirements of the engraving process. Next, the pattern design is cut into a steel tool of about 2-5 inches diameter and width. Originally this was done by hand using a large scale drawing and a replicating pantograph. This process has since been mechanized with the advent of CAD drawings and CNC machining.

Once the small tool has been cut, the pattern is then transferred 3 to 11 times to a series of successively larger tools until a finished engraving tool of about 6-15 inches diameter and width has been made. These pattern transfers can be accomplished by coating a prepared steel blank with an acid resistant wax blend; running the pattern tool repeatedly against the blank to remove the wax wherever the high points of the pattern tool touch it; using an acid bath to etch the exposed steel; and repeating the process as needed to reach the desired engraving depth. Upon completion of the finished engraving tool, the engraving of a commercial steel roll can be started. The process of engraving the roll is substantially the same as that used to transfer the pattern during the tooling stages.

One benefit of the conventional engraving process is the consistency between engraved rolls since once a tool has been made all subsequent engravings are nearly identical in all respects. Another benefit is the wide availability of the technology providing a choice of suppliers. An additional benefit can be lower costs, especially for producing five or more identical rolls.

One possible disadvantage of conventional engraving is the high tooling cost and lead time needed to produce an engraved roll. Furthermore, sidewall angles are practically limited to about 20 degrees or more by the requirement to avoid having the sides of the cavities on the tool come into contact with the pins being formed on the roll. This limit can be imposed by the arc swept by the pins and cavities as the tool rotates against the roll in a manner similar to gear teeth meshing and having a similar limitation. Additionally, the top spacing between two separate embossing elements is practically limited to greater than 0.030 inch at common engraving depths because of these sidewall angles.

Another method of producing a male embossing roll is laser engraving a deformable surface of the roll. Essentially, a steel roll core is coated with a layer of elastomeric, rubber, or plastic material that is generally significantly higher on the Shore A Durometer scale than the rubber roll it is intended to run against. The laser is then used to directly burn away the unwanted areas of the roll's surface around the raised embossing pattern. While elastomeric, rubber, or plastic are well suited to laser engraving because they are composed of combustible organics, the resulting embossing rolls did not perform as well as conventionally engraved steel rolls for some applications in commercial use. Difficulties included a short working life where the top edges of the patterns typically wore off after 2-3 months of service. A further disadvantage can be the inability of the laser to accurately round off the top edges of the embossing elements and to accurately deliver consistent sidewall angles. While laser engraved elastomeric, rubber, or plastic rolls are economical to produce, they are generally used for prototype or development work due to the short service life.

Directly laser engraving a steel roll was originally thought to be impractical because of the power required to vaporize the steel to create the embossing element. Recently, at least two companies are known to have developed techniques that enable them to laser engrave commercial steel rolls. These companies are Northern Engraving & Machine Co. of 1731 Cofrin Drive Green Bay, Wis. USA, and A.+E. UNGRICHT GMBH+CO KG of Karstraβe 90 D-41068 Mönchengladbach, Germany.

Laser engraved steel rolls have several benefits over conventionally engraved steel rolls such as rapid production cycles; elimination of the need for a tool which reduces the cost and lead time; and elimination of the sidewall angle limitations imposed by the conventional engraving process. Additionally, since the exterior of the roll is made of steel, unlike previous laser engraved rolls, laser engraved steel rolls have a long service life in the commercial production of embossed substrates.

Referring to FIG. 1, common parameters for a male embossing element 25 are illustrated. Regardless of the actual embossing pattern applied to the substrate, several parameters need to be selected before the pattern can be engraved by either conventional engraving or laser engraving techniques. Element height 20, or engraving depth, refers to the distance between a top 22 and a base 24 of the embossing element 25. The chosen element height is often different depending on the embossing pattern and application. Higher element heights are generally used in situations that require a large increase in bulk. Lower element heights are generally used in situations that require a denser finished product. Typical element heights for embossing paper towel substrates are generally between about 0.040 inch to about 0.065 inch, with about 0.055 inch being fairly common. Typical element heights for bath tissue substrates are generally between about 0.020 inch to about 0.055 inch, with about 0.045 inch often selected as a starting point. Typical element heights for paper napkin substrates are generally between about 0.025 inch to about 0.045 inch, with about 0.035 inch being fairly common.

Sidewall angle 26 refers to the angle of the sidewall(s) 27 of the embossing element with respect to an orthogonal axis 28 that intersects with the base. As used herein, a "sidewall" extends from the top of the element to the base of the element. The sidewall angle is considered positive if the sidewall extends outwardly from the top towards the base as illustrated by the solid line. The sidewall angle is considered negative if the sidewall extends inwardly beneath the top towards the base (undercut) as illustrated by the dashed line. Common sidewall angles are generally +20 to +30 degrees, and steel engravers usually suggest +25 degrees as a starting point. In general, larger sidewalls angles are easier to engrave and keep clean of dust in operation, while smaller sidewall angles can provide improved embossing clarity or ply attachment.

Top radius 30 and bottom radius 32 refer to the radius of curvature at the top and bottom of the embossing element. The radii are generally the same, and range from about 0.001 inch to about 0.010 inch, with about 0.005 inch being fairly common. In general, larger radii are easier to engrave and result in less degradation at a given embossing level, while smaller radii are better for embossing clarity and result in more bulk at a given embossing level.

Width 33 of the top refers to the width at the top of the embossing element. The embossing element also has a length 31 (not illustrated) that refers to the length (depth into the page as illustrated) of the embossing element at the top. Thus, the width and length of the embossing element at the top determines how large the embossing element is and the resulting embossed area in the substrate.

Figure 1A:
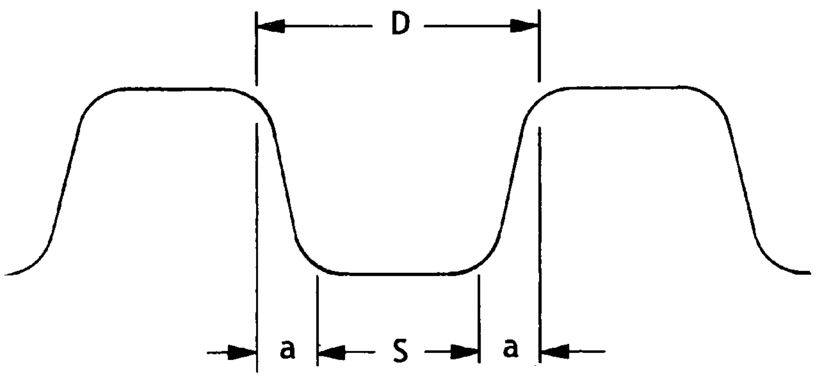
FIG. 1A illustrates spacing between two embossing elements.

Referring to FIG. 1A, the spacing D between adjacent embossing elements is given by the formula D=2×tan (sidewall angle)×element height+S. For a typical sidewall angle of 20 degrees and an element height of 0.040 inches, the minimum spacing between elements when S equals zero and the bottom radius of adjacent elements intersect is approximately 0.03 inch.

Figure 2:
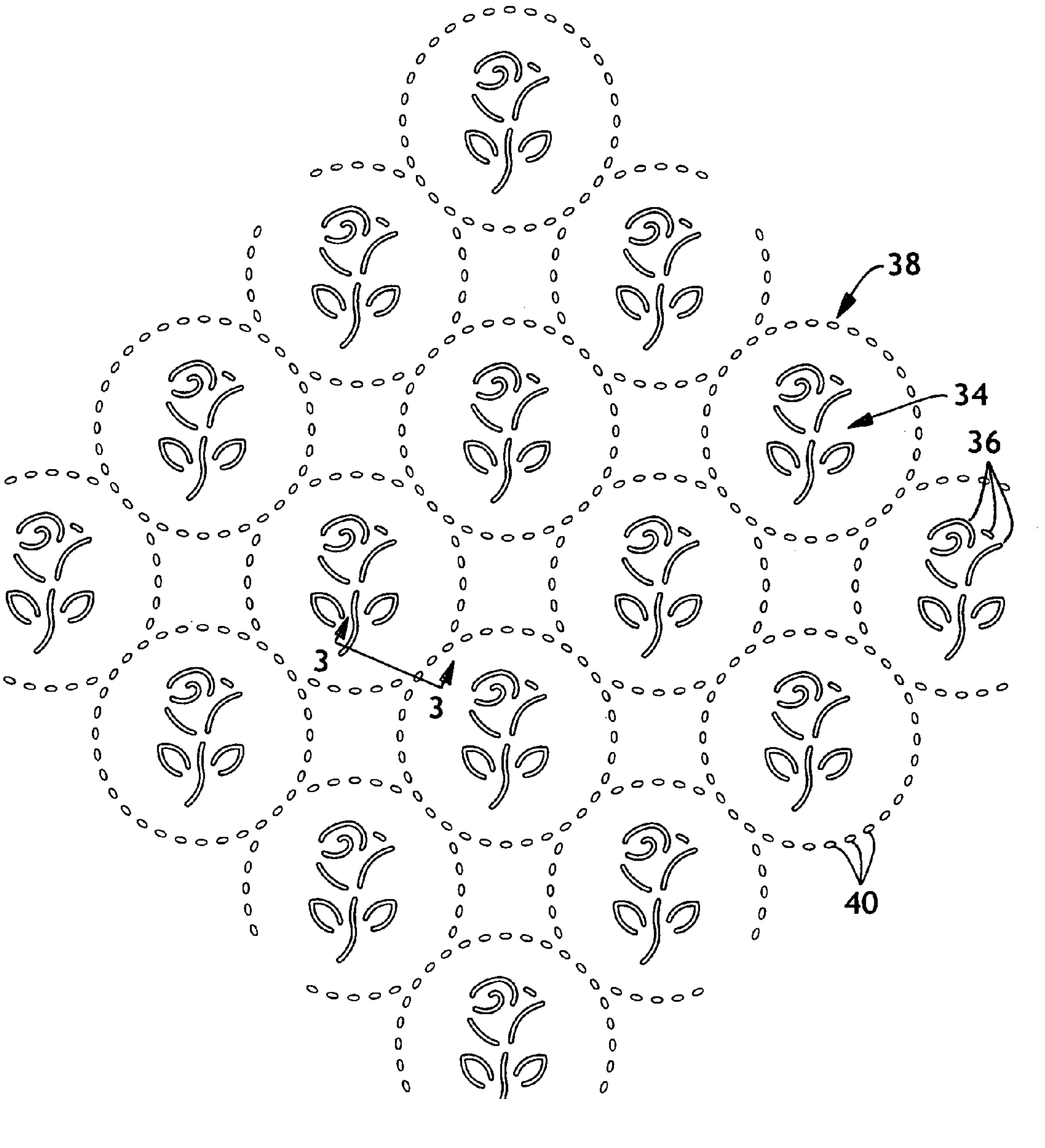
FIG. 2 illustrates an embossing pattern for embossing a substrate.

Referring now to FIG. 2, an embossing pattern useful for embossing substrates such as a facial tissue, a bath tissue, or a paper napkin is illustrated. The pattern includes a flower 34 composed of a plurality of flower embossing elements 36 surrounded by a plurality of circular dots 38 formed by a plurality of dot embossing elements 40. The flower and dot embossing elements have different embossing geometries for the male embossing elements.

Figure 3:
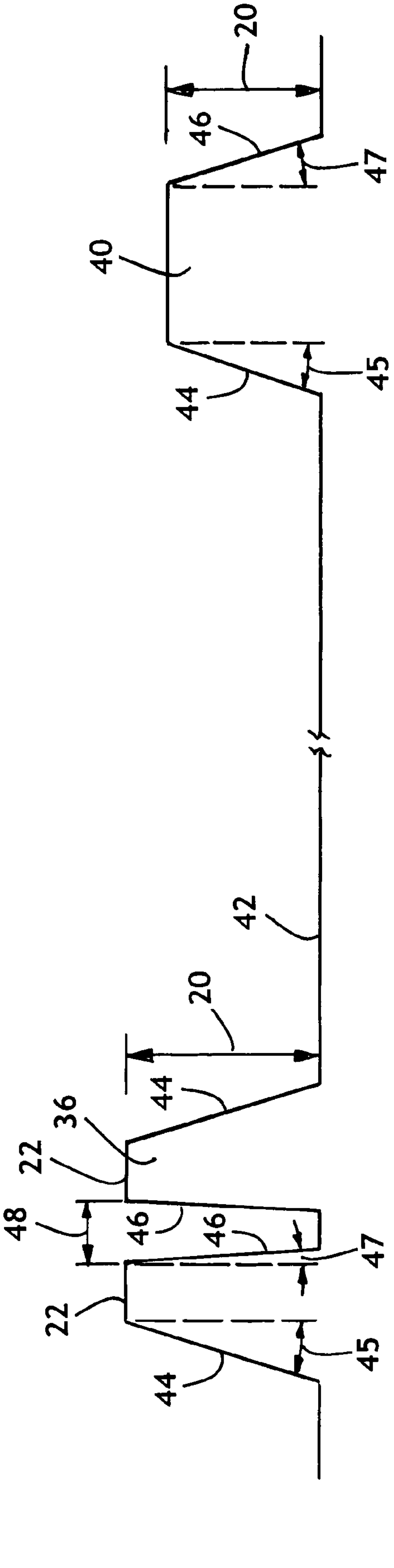
FIG. 3 illustrates a cross section of the embossing pattern of FIG. 2 taken at 3-3 and utilized to produce the embossed sheet shown in FIG. 5.

Referring now to FIG. 3, a cross-section of the male embossing elements taken at 3-3 in FIG. 2 is illustrated. The embossing surface 42 is composed of a plurality of flower embossing elements 36 and dot embossing elements 40. The embossing surface can be the exterior surface of an embossing roll, a flat embossing plate, or an embossing tool.

Dot embossing element 40 is a conventional embossing element having a first sidewall 44, a first sidewall angle 45, a second sidewall 46, and a second sidewall angle 46. The first and the second sidewall angles are equal and have a value of approximately 22 degrees. The dot embossing element has an embossing height of approximately 0.040 inch. The top and the bottom embossing radius are equal and have a value of approximately 0.005 inch.

Flower embossing element 36 has a unique geometry that produces enhanced pattern definition and clarity for the flower. The embossing element has at least one first sidewall 44, at least one first sidewall angle 45, at least one second sidewall 46, and at least one second sidewall angle 47. Thus, the flower embossing element can be just one side or one half of the illustrated element. Also, the base of the embossing element 36 can be the top of another larger embossing element such that embossing element 36 is located on top of another embossing element. The illustrated flower embossing element has a pair of first sidewalls 44 disposed on the exterior of the element and a pair of second sidewalls 46 disposed on the interior of the element. The interior sidewalls 46 are separated by a gap 48 at the top of the embossing element.

Of special interest is the fact that the first and the second sidewall angles are substantially different. In particular, the first sidewall angle 45 is significantly greater than the second sidewall angle 47. Furthermore, the second sidewall 46 is extremely steep compared to a conventional embossing element. This enables the gap 48 at the top of the embossing element to be much smaller than the 0.03 inch minimum spacing obtainable between conventional embossing elements having a 20 degree or greater sidewall angle. Thus, any two embossed lines on the embossed substrate can be spaced less than 0.030 inch if desired. Previously this was not possible using conventional embossing elements. In various embodiments of the invention, the gap can be less than 0.030 inch, or less than about 0.025 inch, or less than about 0.020 inch, or less than about 0.015 inch, or the gap can be between about 0.005 inch to 0.030 inch, or between about 0.005 inch to about 0.025 inch, or between about 0.015 inch to about 0.025 inch.

As mentioned, the first sidewall angle 45 is much greater than the second sidewall angle 47 forming an embossing element having non-symmetric sidewall angles. In various embodiments of the invention the first sidewall angle can be greater than the second sidewall angle by about 5 degrees or more, or by about 10 degrees or more, or by about 15 degrees or more, or by about 20 degrees or more. In various embodiments of the invention, the first sidewall angle can be about 10 degrees or greater or about 15 degrees or greater, or the first sidewall angle can be between about 10 degrees to about 50 degrees, or between about 15 degrees to about 30 degrees, or between about 15 degrees to about 25 degrees. In various embodiments of the invention, the second sidewall angle can be about 10 degrees or less, about 5 degrees or less, or about 1 degree or less, or the second sidewall angle can be between about −30 degrees to about +10 degrees, or between about −20 degrees to about +5 degrees, or between about −10 degrees to about +5 degrees, or between about −5 degrees to about +5 degrees.

The height of embossing element 36 can be adjusted as needed depending on the substrate to be embossed. Similarly, the top and bottom radii can be adjusted as needed. Furthermore, the top and bottom radii can be different values from the top to the bottom or from the first sidewall to the second sidewall, or the same values. In FIG. 3, for element 36 the top radius of the second sidewall 46 was approximately 0.003 inch and the top radius of the first sidewall 44 approximately 0.005 inches. This was done to provide a sharper fold at the edges of the tissue substrate in contact with gap 48 during embossing.

The length of the embossing element can be adjusted as needed depending on the design. In various embodiments of the invention, the length can be greater than about 0.060 inches.

TABLE 1

| Engraving Parameters for Elements 36 and 40 in FIG. 3 | | | |
|---|---|---|---|
| Engraving Parameter | Units | Element 36 | Element 40 |
| Height (20) | Inches | 0.050 | 0.040 |
| First (44) Sidewall Angle (26) | Degrees | 18 | 18 |
| Second (46) Sidewall Angle (26) | Degrees | 3 | 18 |
| Top Width (33) | Inches | 0.015 | 0.040 |
| Top Length (31) | Inches | Varies with flower segment | 0.080 |
| Top Radius (30) First Sidewall (45) | Inches | 0.005 | 0.005 |
| Top Radius (30) Second Sidewall (46) | Inches | 0.003 | 0.005 |
| Bottom Radius (32) First Sidewall (44) | Inches | 0.005 | 0.005 |
| Bottom Radius (32) Second Sidewall (46) | Inches | 0.003 | 0.005 |
| Gap Width (48) | Inches | 0.015 | N/A |

Figure 4:
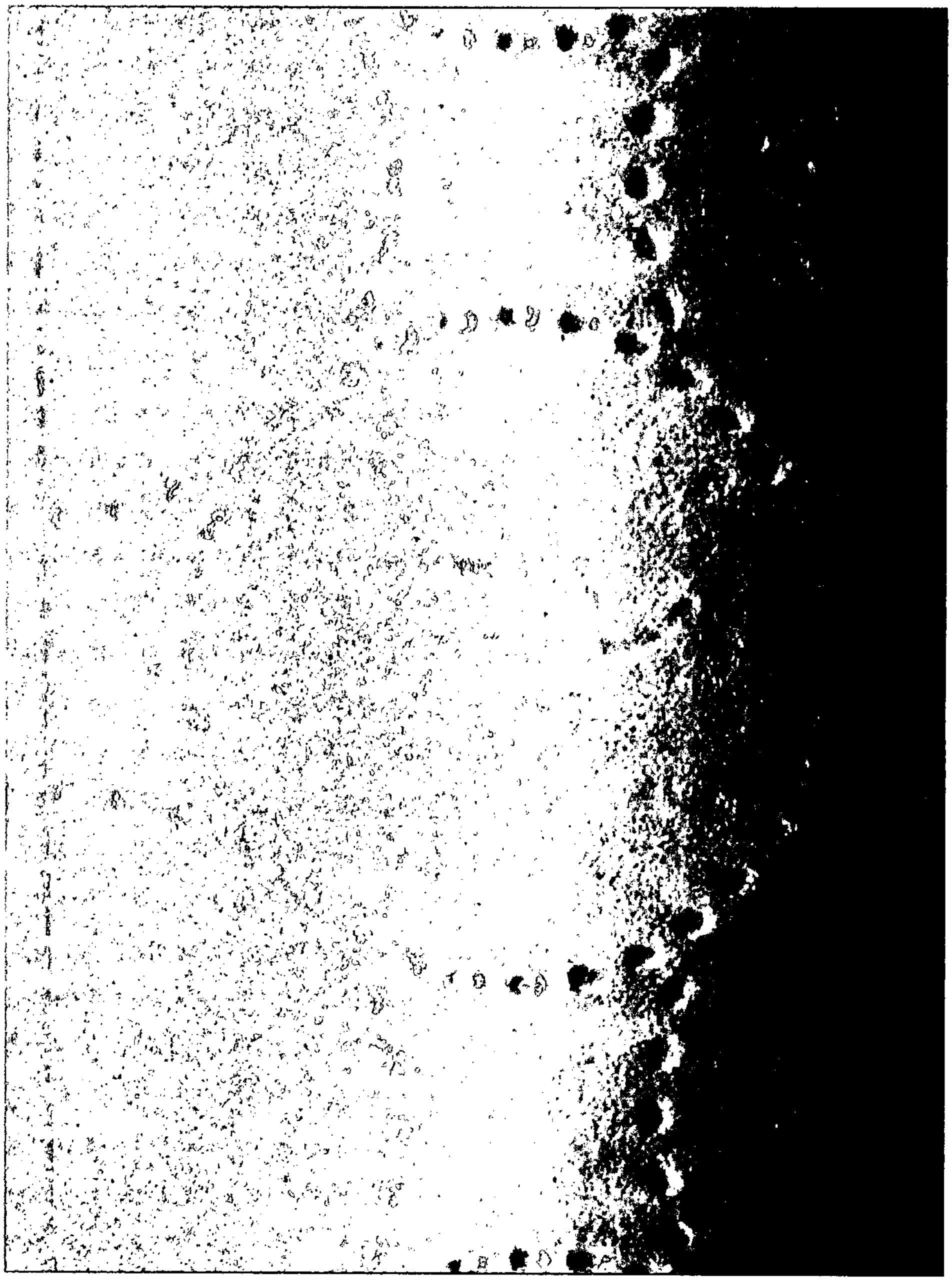
FIG.4 ( PRIOR ART)
FIG. 4 illustrates a substrate embossed by an embossing roll having conventionally engraved embossing elements with 22 degree sidewall angles.

Referring now to FIG. 4, an embossed substrate comprising a 30.5 gsm creped tissue sheet is illustrated. The tissue was embossed using an embossing nip to replicate the embossing pattern of FIG. 2 onto the substrate. The embossing pattern was engraved male into a plastic roll surface having a hardness of about 98 on the Shore A Durometer scale. The roll was produced by Midwest Rubber Plate Company of 1453 Earl Street, Menasha, Wis. USA. The engraving was made using all conventional embossing elements for both the flower and the dots. Thus, the flower embossing element 36 was a solid element at the top without the gap 48 present. The embossing elements had symmetric sidewall angles of approximately 22 degrees.

The tissue was embossed with the embossing pattern roll nipped with an elastomeric roll covered with 0.625 inch thick Uni-bond NH-120 cover available from American Roller Company of 1440 13th Avenue, Union Grove, Wis. USA. The cover measured approximately 65 Shore A hardness. The tissue was embossed with a nip load of approximately 170 pounds/inch (pli) at a line speed of approximately 400 ft/min.

Figure 6:
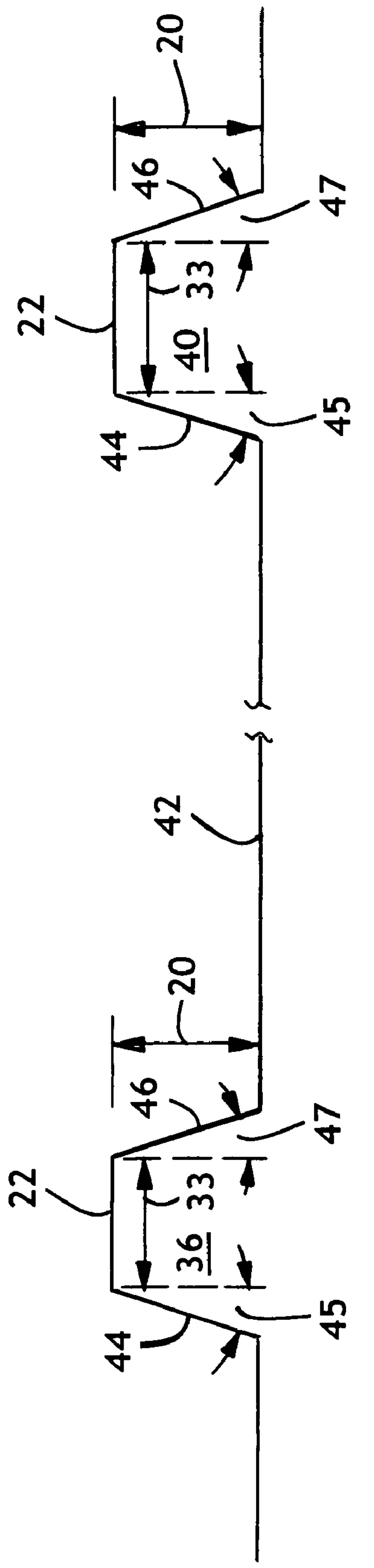
FIG. 6 illustrates a cross section of the embossing pattern utilized to produce the embossed sheet shown in FIG. 4.

Referring to FIG. 6, a cross-section of the embossing roll used to emboss the substrate of FIG. 4 is illustrated.

TABLE 2

| Engraving Parameters for Elements 36 and 40 in FIG. 6 | | | |
|---|---|---|---|
| Engraving Parameter | Units | Element 36 | Element 40 |
| Height (20) | Inches | 0.040 | 0.040 |
| First (44) Sidewall Angle (26) | Degrees | 22 | 22 |
| Second (46) Sidewall Angle (26) | Degrees | 22 | 22 |
| Top Width (33) | Inches | 0.025 | 0.040 |
| Top Length (31) | Inches | Varies with flower segment | 0.080 |
| Top Radius (30) First Sidewall (45) | Inches | 0.005 | 0.005 |
| Top Radius (30) Second Sidewall (46) | Inches | 0.005 | 0.005 |
| Bottom Radius (32) First Sidewall (44) | Inches | 0.005 | 0.005 |
| Bottom Radius (32) Second Sidewall (46) | Inches | 0.005 | 0.005 |

Figure 5:
FIG. 5 illustrates a substrate embossed by an embossing tool having embossing elements of the present invention.

Referring now to FIG. 5, another embossed substrate comprising the same 30.5 gsm creped tissue sheet as FIG. 4 is illustrated. The tissue was embossed using a steel embossing tool to replicate the pattern of FIG. 2. The tool was constructed as illustrated in FIG. 3 with non-symmetric flower embossing elements 36 having the gap 48 and symmetric dot embossing elements 40.

The tissue was embossed by placing the tissue between the tool and a second embossing tool covered with a 0.750 inch thick NITRILE roll cover available from Valley Roller Company of N. 257 Stoney Brook Road, Appleton, Wis. USA. The cover measured approximately 55 Shore A hardness. The tissue was embossed at approximately 20 ft/min. The embossing pressure between the two embossing tools was adjusted such that the dot embossing elements forming the circles were visually about the same clarity as the embossed tissue of FIG. 4.

While the two processes used to emboss the substrates in FIGS. 4 and 5 are not identical, the results can be compared to show that the inventive embossing elements produce better pattern definition in the embossed substrate. Since the dot embossing elements 40 used to emboss both substrates in FIGS. 4 and 5 were nearly identical (the only difference being the reduction of the sidewall angle from 22 to 18 degrees), the embossing definition produced by the dot embossing elements can be used as a control when comparing FIGS. 4 and 5. Of interest in FIG. 4 is that the circular dots are more defined than the circular dots in FIG. 5. This implies that the substrate of FIG. 4 was embossed at a higher load than the substrate of FIG. 5. While the circular dots of FIG. 5 are less defined, the flower of FIG. 5 embossed using the inventive embossing elements is more defined than the flower of FIG. 4. Thus, even though the substrate of FIG. 5 was probably embossed to a lower level than the substrate of FIG. 4 (as determined by comparing the embossed dots), the definition of the flower is much better due to the inventive embossing elements.

Without wishing to be bound by theory it is believed that the improved embossing definition or clarity results from having created additional fold lines within the embossing pattern. In the examples shown, there are twice as many fold lines in the improved embossing element as there were in the conventional embossing element, these additional folds having been produced by the inclusion of the gap 48. The inclusion of additional lines within the pre-existing space of the embossing element produces sharpness within the embossed substrate since the gap helps to produce a more distinctive pattern in the substrate. The additional embossed lines in the substrate also tend to resist flattening out in the winding process as a result of the more distinct pattern.

Modifications and variations to the present invention may be practiced by those of ordinary skill in the art, without departing for the spirit and scope of the present invention, which are more particularly set forth in the appended claims. For example, the same principles disclosed above for the design of a male embossing element can be applied to the design of a female embossing element. It is understood that aspects of the various embodiments may be interchanged in whole or part. All cited references, patents, or patent applications in the above application for letters patent are herein incorporated by reference in a consistent manner. In the event of inconsistencies or contradictions between the incorporated references and this specification, the information present in this specification shall prevail. The preceding description, given by way of example in order to enable one of ordinary skill in the art to practice the claimed invention, is not to be construed as limiting the scope of the invention, which is defined by the claims and all equivalents thereto.

I claim:

1. An apparatus comprising:

a surface containing at least one elongated curvilinear embossing element having a length of about 0.06 inch or greater and a top comprising a flat surface having a width;

the embossing element having a first sidewall extending from a base to the top having a first sidewall angle, said first sidewall having a length perpendicular to the width of the top surface, and a second sidewall opposing the first sidewall, the second sidewall extending from the base to the top and having a second sidewall angle, said second sidewall having a length perpendicular to the width of the top surface; and wherein the first sidewall angle is different than the second sidewall angle.

2. An apparatus comprising:

a surface containing at least one elongated curvilinear embossing element having a length of about 0.06 inch or greater and a top comprising a flat surface having a width;

the embossing element including a pair of exterior first sidewalls extending from a base to the top disposed at a first sidewall angle, said pair of exterior first sidewalls having a length perpendicular to the width of the top surface, and a pair of interior second sidewalls separated by a gap extending from the top towards the base, said pair of interior second sidewalls having a length perpendicular to the width of the top surface, the pair of interior second sidewalls disposed at a second sidewall angle; and wherein the first sidewall angle is greater than the second sidewall angle by about 5 degrees or more.

3. The apparatus of claim 1 or 2 wherein the embossing element comprises a male embossing element.

4. The apparatus of claim 1 wherein the first sidewall angle is greater than the second sidewall angle by about 5 degrees or more.

5. The apparatus of claim 1 or 2 wherein the first sidewall angle is greater than the second sidewall angle by about 15 degrees or more.

6. The apparatus of claim 1 or 2 wherein the second sidewall angle is about 10 degrees or less.

7. The apparatus of claim 1 or 2 wherein the second sidewall angle is about 5 degrees or less.

8. The apparatus of claim 7 wherein the embossing surface comprises a metal roll.

9. The apparatus of claim 1 or 2 wherein the first sidewall angle is about 10 degrees or more.

10. The apparatus of claim 1 or 2 wherein the first sidewall angle is about 15 degrees or more.

11. The apparatus of claim 10 wherein the embossing surface comprises a metal roll.

12. The apparatus of claim 2 wherein the gap between the pair of interior sidewalls at the top of the embossing element is less than 0.030 inch.

13. The apparatus of claim 2 wherein the gap between the pair of interior sidewalls at the top of the embossing element is between about 0.005 inch to 0.030 inch.

14. The apparatus of claim 2 wherein the embossing surface comprises a metal roll.

15. The apparatus of claim 2 comprising a top radius joining each sidewall to a top of the embossing element and wherein the top radius for the pair of exterior first sidewalls is different than the top radius for the pair of interior second sidewalls.

16. The apparatus of claim 15 wherein the top radius for the pair of exterior first sidewalls is greater than the top radius for the pair of interior sidewalls.

17. The apparatus of claim 2 wherein the first sidewall angle is about 15 degrees or more, the second sidewall angle is about 5 degrees or less, the gap between the pair of interior sidewalls at the top of the embossing element is between about 0.005 inch to 0.030 inch, and the embossing surface comprises a metal roll.

* * * * *